United States Patent [19]

St. Clair

[11] Patent Number: 5,212,283
[45] Date of Patent: May 18, 1993

[54] POLYIMIDES CONTAINING THE CYCLOBUTENE-3, 4-DIONE MOIETY

[75] Inventor: Terry L. St. Clair, Poquoson, Va.

[73] Assignee: The United States of America as represented by the Administrator of the National Aeronautics and Space Administration, Washington, D.C.

[21] Appl. No.: 845,090

[22] Filed: Mar. 3, 1992

[51] Int. Cl.$^5$ .................. C08G 69/26; C08G 73/10
[52] U.S. Cl. ........................... 528/353; 528/125; 528/128; 528/170; 528/172; 528/173; 528/176; 528/183; 528/184; 528/185; 528/188; 528/220; 528/229; 428/473.5
[58] Field of Search ............ 528/353, 125, 128, 170, 528/172, 173, 176, 183, 184, 185, 188, 220, 229, 350; 428/473.5

[56] References Cited

U.S. PATENT DOCUMENTS

| | | | |
|---|---|---|---|
| 4,065,345 | 12/1977 | Progar et al. | 528/353 |
| 4,094,862 | 6/1978 | Bell | 528/353 |
| 4,546,188 | 10/1985 | Algieri et al. | 546/194 |
| 4,656,180 | 4/1987 | Postius et al. | 514/316 |
| 4,728,593 | 3/1988 | Freilich et al. | 430/72 |
| 4,837,300 | 6/1989 | St. Clair | 528/353 |
| 4,895,972 | 1/1990 | Stoakley | 528/353 |
| 4,914,181 | 4/1990 | Pfeifer | 528/353 |
| 4,987,197 | 1/1991 | Ohta | 528/353 |
| 5,026,823 | 6/1991 | Summers | 528/353 |
| 5,061,783 | 10/1991 | St. Clair | 528/353 |

OTHER PUBLICATIONS

Chemical Abstracts, vol. 83, No. 26: 206739v, Dec. 29, 1975, "N(s) X-ray photoelectron and electronic absorption spectra of poly(squarylamides)", Neuse, et al.
Chemical Abstracts, vol. 75, No. 10: 64331q, Sep. 6, 1971, "Polar Superpolyamides", Gauger, et al.
Macromolecular Syntheses, vol. 5, 1974, "Squaric Acid-1,3-Polyamides", pp. 39-42, G. Manecke, et al.
Chemical Abstracts, vol. 114, No. 20: 196366p, "Electrophotographic photoresceptor using squarylium pigment as charge-generating agent", Akao, et al., May 20, 1991.
Chemical Abstracts, vol. 71, No. 14: 61825k, Oct. 6, 1969, "Polar Polyamides", Manecke, et al.
Polymer Preprints, vol. 32, No. 3, Aug, 1991, "Synthesis, Poling & Optical Characterization of Polyurethanes Bearing NLO-active Chromophones", Kitipichai et al, pp. 146-147.
Chemical Abstracts, vol. 79, No. 2, Jul. 16, 1973, 5674p, "Polyamides derived from squaric acid," Green, et al.
Chemical Abstracts, vol. 81, No. 24: 152677m, "Poly(squaryl amides)", Neuse, et al.

Primary Examiner—John Kight, III
Assistant Examiner—P. Hampton-Hightower
Attorney, Agent, or Firm—George F. Helfrich

[57] ABSTRACT

Linear aromatic polyimides containing the cyclobutene-3,4-dione moiety were produced by reacting 1,2-bis(4-aminoanilino)cyclobutene-3,4-dione with several aromatic dianhydrides. The resulting polymers exhibited glass transition temperatures greater than 500° C., adhered tenaciously to glass, and became more flexible after heating for 1 hour at 300° C.

10 Claims, No Drawings

POLYIMIDES CONTAINING THE CYCLOBUTENE-3, 4-DIONE MOIETY

ORIGIN OF THE INVENTION

The invention described herein was made by employees of the United States Government and may be manufactured and used by or for the Government for governmental purposes without payment of any royalties thereon or therefor.

BACKGROUND OF THE INVENTION

1. Field of the Invention

The present invention relates to polyimides. In particular, it relates to polyimides containing the cyclobutene-3,4-dione chemical moiety.

2. Description of the Related Art

Because of their outstanding thermal stability, low density, electrical insulating capability, and toughness and stability to organic solvents, linear aromatic polyimides are used for applications in the electronics and aerospace industries. They are especially attractive to these industries because of their toughness, flexibility, and ability to be formed into complex shapes both with and without reinforcements such as glass or graphite fibers. In the electronics industry, polyimides are widely used as dielectric interlayers because of their high dielectric constants and their ability to form uniform coatings over a variety of substrates.

The need exists for high temperature polymers such as polyimides which can be processed into films, adhesives, and coatings that can withstand a highly oxidative environment. This environment is often seen on the outer structural surfaces of supersonic aircraft; jet engine components; and on spacebased devices. However, the application of most polyimides are limited by their glass transition temperatures (Tgs) which, when approached, causes a decrease in their mechanical properties which can result in debonding, creep, and delamination.

SUMMARY OF THE INVENTION

Linear aromatic polyimides containing the cyclobutene-3,4-dione moiety were produced from the reaction of a substituted or unsubstituted 1,2-bis(4-aminoanilino)-cyclobutene-3,4-dione (SQDA) with various aromatic dianhydrides. These polymers had the following general structural formula:

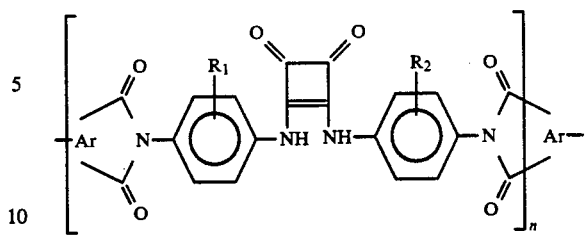

where $n = 10-100$; Ar is any aromatic moiety; and $R_1$ and $R_2$ each is a hydrogen or a lower alkyl group having 1 to 4 carbon atoms. The lower alkyl group is a straight or branched alkyl group having 1 to 4 carbon atoms. Examples of the lower alkyl include methyl, ethyl, propyl, isopropyl, butyl, secondary butyl, tertiary butyl and the like.

The polymerization of the various dianhydrides with SQDA were carried out in N,N-dimethylacetamide (DMAc) at 7.45 to 15.00 percent solids (weight/weight) at ambient conditions. The dianhydrides employed in preparing the polyimides were: 3,3',4,4'-benzophenone tetracarboxylic dianhydride (BTDA); pyromellitic dianhydride (PMDA); 4,4'-oxydiphthalic anhydride (ODPA); and 3,3',4,4'-biphenyl tetracarboxylic dianhydride (BPDA).

These polymers had high molecular weights and their glass transition temperatures (Tgs) were greater than 500° C. Despite the very high Tg, these polymers exhibited excellent adhesion to glass. In addition, the films of these polyimides increased in flexibility with increasing cure temperatures.

An object of the present invention is to prepare linear aromatic polyimides which contain the cyclobutene-3,4-dione moiety.

Another object of the present invention is to prepare films from the polyimides.

Another object of the present invention is to prepare adhesives from the polyimides.

DESCRIPTION OF THE PREFERRED EMBODIMENTS

By the present invention, linear aromatic polyimides were produced which contain the cyclobutene-3,4-dione moiety. The general scheme for preparing these polyimides is shown in scheme I. Table I summarizes the inherent viscosity data, cure schedule, weight loss profile, and physical characteristics of the polyimides that were synthesized.

SCHEME I

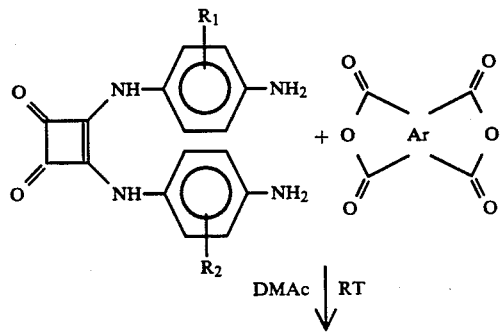

SCHEME I

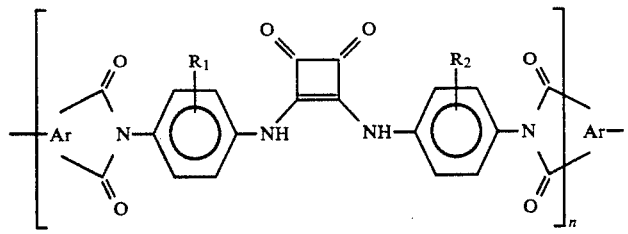

n=10 to 100; and $R_1$ and $R_2$ each is a hydrogen or a lower alkyl group.

TABLE I

| | | SQUARIC POLYIMIDES | | | |
|---|---|---|---|---|---|
| | Inherent | | Weight Loss Temperature, °C. | | |
| Dianhydride | Viscosity | Cure | 5% | 25% | 50% | Physical Character* |
| BTDA | 1.19 | 200° C. | 283 | 490 | 531 | Orange/brown; Flexible |
| ODPA | 0.77 | 200° C. | 259 | 458 | 516 | Yellow/brown; Brittle |
| PMDA | 1.64 | 200° C. | 206 | 453 | 516 | Orange/brown; Brittle |
| BPDA | 0.64 | 200° C. | 317 | 491 | 529 | Light brown; Brittle |
| BTDA | 1.19 | 300° C. | 329 | 500 | 532 | Red/brown; Flexible |
| ODPA | 0.77 | 300° C. | 317 | 494 | 527 | Yellow/brown; Flexible |
| PMDA | 1.64 | 300° C. | 309 | 462 | 514 | Brown/orange; Brittle |
| BPDA | 0.64 | 300° C. | 319 | 507 | 540 | Light brown; Brittle |
| BTDA | 1.19 | 400° C. | 337 | 491 | 526 | Red/brown; Flexible |

*All films have a translucent appearance after 200° C. cure which indicates crystallinity; however no melting is noted on DSC. Translucency persists after 300° C. cure.

The four aromatic dianhydrides that were employed in preparing these polyimides were: 3,3',4,4'-benzophenone tetracarboxylic dianhydride (BTDA); pyromellitic dianhydride (PMDA); 4,4'-oxydiphthalic anhydride (ODPA); and 3,3',4,4'-biphenyl tetracarboxylic dianhydride (BPDA). Other aromatic dianhydrides known to those skilled in the art may also be used.

The polymerizations of the various dianhydrides with 1,2-bis(4-aminoanillino)cyclobutene-3,4-dione (SQDA) were carried out in N,N-dimethylacetamide (DMAc) at 7.45 to 15.00 percent solids (weight/weight) at ambient conditions. In addition to DMAc, other solvents known to those skilled in the art may also be employed.

The thermal stabilities, based on the temperatures where 5, 25, and 50 percent weight losses were found when the polymer was heated in air from ambient to 600° C. at a heating rate of 2.5° C./minute, were very high for all the polymers in this invention. No melting or Tg was noted when the films were heated from ambient to 500° C. at 20° C./minute using differential scanning calorimetry (DSC).

In all cases, the resulting polyimide films adhered tenaciously to glass. The coated glass had to be immersed in warm water for 1 hour and a sharp razor blade was required to remove the polymer from the glass. This phenomenon was quite unusual for a polyimide with a very high Tg.

The observation was also made that as these films were further cured for 1 hour at 300° C., they showed a considerable increase in flexibility. This property was unexpected as most polyimides show a slight amount of embrittlement with increasing curing temperatures.

Because of its excellent adhesion and increased flexibility, this material is useful as a high temperature adhesive.

The following examples are illustrative of the invention.

EXAMPLE 1

Synthesis of 1,2-Bis(4-aminoanilino)cyclobutene-3,4-dione (SQDA)

The squaric acid derivatized diamine, SQDA, was prepared in the following manner. First, 6.50 g (60 mmol) p-phenylenediamine was dissolved in 50 ml of methanol. A solution of 1.70 g (10 mmol) of the diethyl squarate in 20 ml of methanol was added in a dropwise manner to the p-phenylenediamine solution at room temperature over a period of 1 hour. This reaction was run under a nitrogen atmosphere. The resulting mixture was stirred for 3 hours at room temperature and allowed to stand overnight. A crystalline product formed in the reaction flask during this period and it was collected by filtration, washed with methanol and vacuum dried for 1 hour at 150° C. to yield 2.50 g of 1,2-bis(4-aminoanilino)cyclobutene-3,4-dione (SQDA) as a greenish-orange solid.

Elemental analysis: Calculated for $C_{16}H_{14}N_4O_2$: C, 65.30; H, 4.79; N, 19.04; O, 10.87. Found: C, 64.81; H, 4.70; N, 18.45; O, 11.25.

Infrared Spectrum (KBr), $CM^{-1}$: 1795, 2700–3700,

Proton NMR (DMSO-$d_6$) δ(ppm): 4.97 (s, 4H); 6.60 (m, 4H); 7.18 (m, 4H); 9.42 (s, 2H).

Carbon-13 NMR (DMSO-$d_6$) δ(ppm): 114.4×2; 120.1×2; 128.0; 145.1; 164.5; 180.8.

EXAMPLE 2

Reaction of 3,3′,4,4′-benzophenone tetracarboxylic dianhydride (BTDA) with SQDA

In a serum bottle, 0.5886 g of the SQDA was admixed with 0.6445 g of BTDA (0.002 molar reaction). Seven grams of DMAc were added and the solution was allowed to stir at ambient temperature. After approximately 5 minutes a build up in viscosity was observed. The solution was stirred for one additional hour. Inherent viscosity was found to be 1.19 dl/g when run at 25° C. at 0.5% concentration in DMAc.

The solution was poured onto a soda-lime glass plate and doctored to a thickness of approximately 0.015 inches; placed in a nitrogen purged dry box and the solvent was allowed to evaporate. After several hours the coated glass plate was placed in a forced air oven and was heated to 200° C. to ensure complete cure of the polymeric coating. The resulting reddish-brown coating adhered tenaciously to the glass.

The coated glass was immersed in warm water for 1 hour and a sharp razor blade was used to initiate removal of the polymer from the glass. The result was a free standing film that was very flexible and tough. This film was heated for an additional hour at 300° C. and still remained flexible and tough.

EXAMPLE 3

Reaction of 4,4′-oxydiphthalic Anhydride (ODPA) with SQDA

The SQDA (0.2943 g, 1 mmol) was mixed with ODPA (0.3102 g, 1 mmol) in 6 ml of DMAc. This afforded a 9.7% solids solution. This mixture was allowed to stir for 24 hours. The inherent viscosity was found to be 0.77 dl/g when run at 25° C. at 0.5% concentration in DMAc.

The solution was poured onto a soda-lime glass plate, dried in a nitrogen purged dry box, placed in a forced air oven and heated to ensure complete cure of the polymeric coating. The resulting yellow/brown coating adhered tenaciously to glass.

The coated glass was immersed in warm water for 1 hour and a sharp razor blade was used to initiate removal of the polymer from the glass. The result was a free standing film that was brittle. This film was heated for an additional hour at 300° C. to yield a flexible yellow/brown film.

EXAMPLE 4

Reaction of 3,3′,4,4′-Biphenyltetracarboxyl dianhydride (BPDA) with SQDA

The SQDA (0.2943 g, 1 mmol) was mixed with 0.2942 g, 1 mmol of BPDA in 6 ml of DMAc and allowed to stir overnight at ambient temperature. This solution was 9.45% solids (weight/weight). Build-up in molecular weight was evidenced by an inherent viscosity of 0.64 dl/g.

The solution was poured onto a soda-lime glass plate, dried in a nitrogen purged dry box, placed in a forced air oven and heated to ensure complete cure of the polymeric coating. The resulting light brown coating adhered tenaciously to glass.

The coated glass was immersed in warm water for 1 hour and a sharp razor blade was used to initiate removal of the polymer from the glass. The result was a free standing film that was brittle. This film was heated for an additional hour at 300° C. to yield a less brittle light brown film.

EXAMPLE 5

Reaction of Pyromellitic Dianhydride (PMDA) with SQDA

The SQDA (0.2943 g, 1 mmol) was mixed with PMDA (0.2182 g, 1 mmol) in 6 ml of DMAc to afford a 7.85% solids (weight/weight) solution. This mixture was allowed to stir and react overnight yielding a very high molecular weight polymer as evidenced by an inherent viscosity of 1.64 dl/g.

The solution was poured onto a soda-lime glass plate, dried in a nitrogen purged dry box, placed in a forced air oven and heated to ensure complete cure of the polymeric coating. The resulting orange/brown coating adhered tenaciously to glass.

The coated glass was immersed in warm water for 1 hour and a sharp razor blade was used to initiate removal of the polymer from the glass. The result was a free standing film that was brittle. This film was heated for an additional hour at 300° C. to yield a less brittle brown/orange film.

EXAMPLE 6

Formation of an Adhesive

The solution from Example 2 is used as an adhesive. The solution is applied to two soda-lime glass plates. The glass plates are placed together and allowed to dry in a dry box. After drying, the plates are heated to 200° C. in a forced-air oven to ensure complete cure of the polymer. This results in two glass plates which are bonded together.

The foregoing specific examples are exemplary and are not to be considered as exhaustive, but merely to illustrate the invention without serving as limitations thereon.

What is claimed as new and desired to be secured by Letters Patent of the United States is:

1. A polyimide having the following general structural formula:

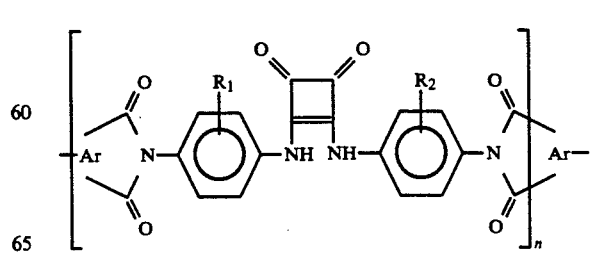

where n=10–100; Ar is any aromatic moiety; and $R_1$ and $R_2$ each is a hydrogen or a lower alkyl group.

2. A polyimide of claim 1, wherein Ar is:

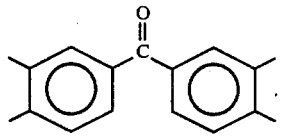

3. A polyimide of claim 1, wherein Ar is:

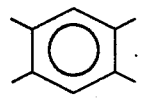

4. A polyimide of claim 1, wherein Ar is:

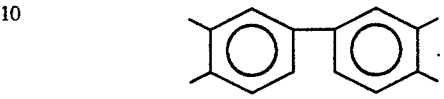

5. A polyimide of claim 1, wherein Ar is:

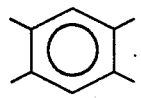

6. A film, prepared from the polyimide of claim 1.

7. An adhesive, prepared from the polyimide of claim 1.

8. A polyimide of claim 1, prepared by combining 1,2-bis(4-aminoanilino)cyclobutene-3,4-dione with a dianhydride.

9. A polyimide of claim 8, wherein said dianhydride is selected from the group consisting of: 3,3',4,4'-benzophenone tetracarboxylic dianhydride; pyromellitic dianhydride; 4,4'-oxydiphthalic anhydride; and 3,3',4,4'-biphenyl tetracarboxylic dianhydride.

10. A polyimide of claim 9, wherein said dianhydride is 3,3',4,4'-benzophenone tetracarboxylic dianhydride.

* * * * *